Aug. 26, 1952     H. P. HAUPT     2,608,143
ROLLER TRANSPORTING MEANS
Filed Jan. 11, 1950
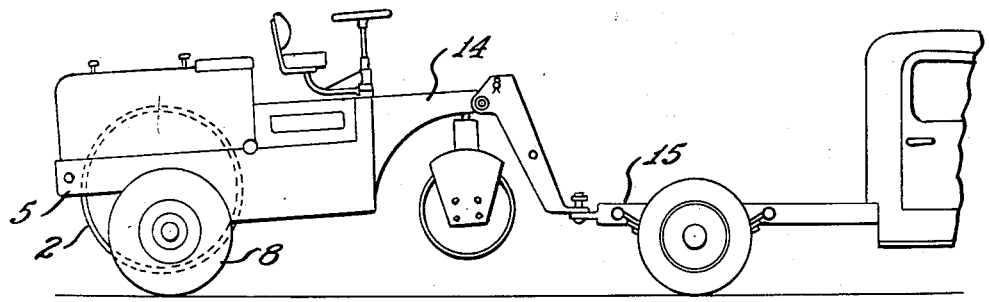
FIG.1.
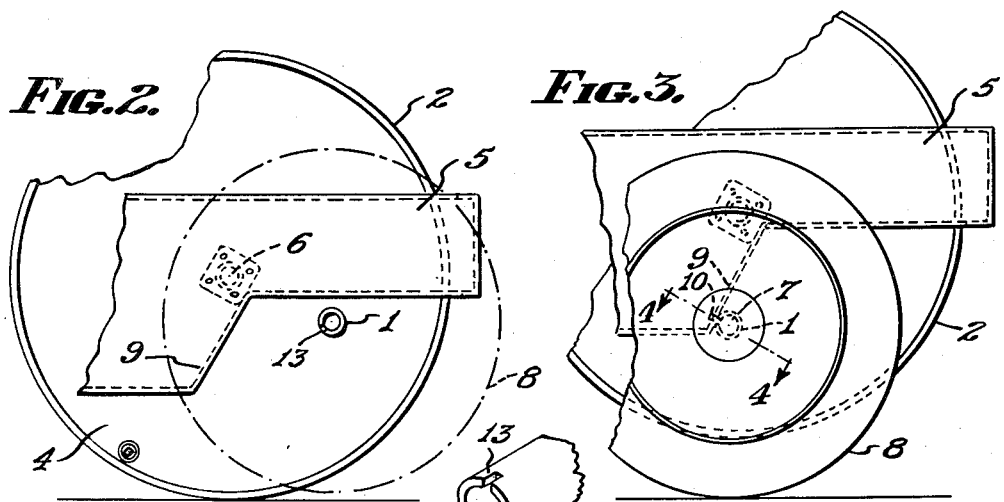
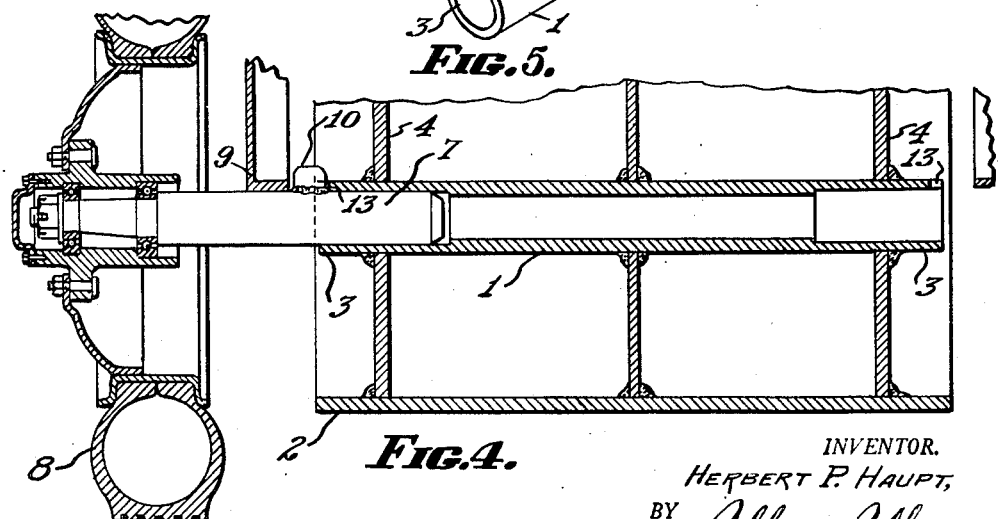
INVENTOR.
HERBERT P. HAUPT,
BY Allen & Allen
ATTORNEYS.

Patented Aug. 26, 1952

2,608,143

UNITED STATES PATENT OFFICE 2,608,143

ROLLER TRANSPORTING MEANS

Herbert P. Haupt, Mount Healthy, Ohio, assignor to Littleford Bros., Inc., Cincinnati, Ohio, a corporation of Ohio Application January 11, 1950, Serial No. 138,010

7 Claims. (Cl. 94—50)

My invention relates to transporting means for low-geared, weighted road rollers when it is necessary to rapidly move them relatively great distances.

The usual type of road roller to which my invention relates, consists of a heavy cylindrical roller wheel which is rotatably mounted in a frame which in turn carries the power unit for moving the roller while it is doing its work. Due to the weight of these rollers and their method of use, the power means is appreciably geared down to the drive wheel so that they move very slowly, even at their top speed. When it is desirable to transport such a roller any great distance over finished highways, it is customary to transport the roller as a whole, either on a truck or some sort of a trailer, so that the heavy roller wheel will not injure the highways and so that the load may be moved at much greater speed than the top speed of the roller itself under its own power.

It is an object of my invention to provide transporting means which include auxiliary wheels which are attached to the roller and support the same on the highway. The front end of the roller is then attached to the tail gate of a truck or tractor and the roller may be rapidly pulled over the highways on the auxiliary wheels which are usually provided with pneumatic tires and thus avoid injuring the highway and permitting relatively high speeds.

It is an object of my invention to provide auxiliary wheels which may be quickly and easily attached and detached to the roller and which include means for easily hoisting the heavy roller up on the auxiliary wheels by the use of the power of the roller itself.

A further object of my invention is to provide wheels as described above which are held locked in position on the roller during its transportation, but which may be quickly and easily unlocked and removed when the roller has arrived at its destination.

A further object of my invention is to provide a transporting means as described above which is relatively inexpensive to manufacture and sell, but which is completely efficient, easy to apply and remove, and simple in its structure.

These and other objects of my invention which will be set forth hereinafter or will be apparent to one skilled in the art upon reading these specifications, I accomplish by that certain construction and arrangement of parts of which I shall now describe an exemplary embodiment.

Reference is now made to the drawings which form a part thereof and in which:

Figure 1 is a side elevation of a road roller mounted for transportation on my novel transporting means.

Figure 2 is a side elevation of the cylindrical roller wheel with the position of the auxiliary wheel shown in broken lines and prior to the roller being lifted on the auxiliary wheels.

Figure 3 is a partial side elevation of the roller wheel lifted up on the auxiliary wheel.

Figure 4 is a cross section taken on the section line 4—4 of Figure 3.

Figure 5 is a perspective view of the end of the tube or pipe which mounts the auxiliary wheels.

Briefly, in the practice of my invention, I provide a longitudinal tube or pipe in the roller wheel of the roller and offset from the center of rotation of the roller wheel. The framework of the roller embraces the ends of the roller wheel, but does not completely cover the same so that the ends of the pipe are available when the roller wheel is in a given position.

I provide stub shafts carrying the auxiliary wheels which may be slipped into the ends of the pipe in the roller wheel.

The diameter of the auxiliary wheels and the position of the pipe with respect to the roller wheel is such that the stub shafts may be inserted in the pipe while the auxiliary wheels are off the ground. Thereupon, the roller itself is driven, thus revolving the roller wheel which moves the stub axles in an arc downwardly and lifts the roller wheel up on the auxiliary wheels. The frame of the roller is so formed that when the roller is riding on the auxiliary wheels, the stub shafts abut and contact a portion of the frame, thus maintaining the roller upon the auxiliary wheels. I also provide a projection on the stub shafts which slips between the frame and the roller wheel end and thus prevents the removal of the stub shafts when the roller is resting on the auxiliary wheels. I also preferably provide a notch in the end of the pipe running through the roller wheel which embraces a portion of the projection on the stub shafts and prevents the rotation of the stub shafts in the pipe.

Referring to the drawings, I insert a pipe 1 longitudinally through the usual roller wheel 2 with a portion of the ends 3 preferably projecting from the roller wheel ends 4. The pipe 1 may be welded in position or bolted or held in any manner desirable.

The frame 5 of the roller overlies a portion of the roller wheel ends 4 as shown in Figure 2 and the roller wheel 2 is rotatably mounted on the frame as at 6 with the pipe 1 offset from the axis of rotation of the roller wheel 2.

I provide stub shafts 7 which are slidable in the ends of the pipe 1. The stub shafts 7 carry the auxiliary wheel 8 which is journaled to the shaft 7 in the usual manner.

The spacing of the pipe 1 from the axle 6 of the roller wheel 2 is such that in one position the auxiliary wheels 8 are above the ground. It is in this position that the wheels 8 are applied by sliding the stub shaft 7 into the pipe 1 (see Figure 2).

The roller is now moved under its own power so the roller wheel 2 rotates so as to carry the pipe 1 downwardly in an arc and to the position shown in Figure 3. In the position shown in Figure 3, the auxiliary wheels 8 rest on the ground and the roller wheel 2, together with the frame 5, are lifted upwardly so the roller wheel 2 clears the ground.

In the position shown in Figure 3, the stub axle 7 abuts a portion 9 of the frame 5. The portion 9 of the frame 5 is so positioned that the stub axle 7 when in contact with it is spaced from a vertical plane running through the axis of rotation of the roller 2 and hence the weight of the roller maintains the stub shaft 7 against the frame portion 9.

In order to prevent the removal of the auxiliary wheels 8 when they are in use, I provide a key or projection 10 on the shafts 7. When the roller is riding on the auxiliary wheels 8, the key or projection 10 slips behind the frame 9. This prevents longitudinal movement of the shaft 7 in the pipe 1 and the removal of the wheels 8 when in transporting position. While I have shown a key 10, it is within the contemplation of my invention to provide any kind of a projection in place of the key 10 which slides between the portion 9 of the frame 5 and the end 4 of the roller wheel 2 when in transporting position, as shown in Figure 3.

In order to prevent the rotation of the stub shaft 7 in the pipe 1 and to position the key 10 properly, I provide a notch 13 on the end 3 of the pipe 1. This notch 13 partially embraces the key 10, determining its position and at the same time preventing rotation of the stub shaft 7 in the pipe 1.

From the above it is apparent that when the roller wheel 2 is in the position shown in Figure 2, the stub shafts 7 carrying the auxiliary transporting wheels 8 may be easily and quickly slipped in or out of the end of the pipe or tube 1. It is no effort to remove the wheels 8 when in this position, since they are off the ground and the weight of the roller is on the roller wheel 2. The roller wheel 2 may be brought to the position shown in Figure 3 very easily by merely driving the roller and in this position the stub shaft 7 carrying the wheels 8 are locked in position and the front end 14 of the roller is lifted by a hydraulic ram onto the tail gate of a truck or a tractor 15 and the whole assembly may be rapidly transported over paved highways at a relatively high rate of speed without injuring the paving.

From the above it is apparent that I have provided auxiliary transporting wheels which may be quickly and easily applied or removed from a heavy road roller and which maintains their position when the road roller is riding on the wheels. There is no necessity of picking up the roller itself, since the revolution of the roller wheel does this work. It is also apparent that my auxiliary wheel mountings are extremely simple, rugged, and inexpensive to construct and maintain, yet which easily and quickly are applicable to a road roller and permit the rapid transportation of the same.

It is to be understood that modification may be made in my invention without departing from the spirit thereof and I do not intend to limit myself otherwise than as pointed out in the claims which follow.

Having thus described my invention, what I claim as new and desire to secure by Letters Patent is:

1. In a roller having a cylindrical roller wheel rotatably mounted within a frame which overlies only a portion of the roller wheel ends, transporting means for the roller comprising a hollow tube running longitudinally through said roller wheel and offset from its axis of rotation, stub shafts carrying wheels removably mounted in said tube ends, said wheels having a radius of greater length than the shortest distance from said tube to the roller wheel surface so that in one position of the roller wheel the wheels will be out of contact with the ground and in a second position of the roller wheel the wheels will support the roller wheel above the ground and means for maintaining said roller wheel in said second position, comprising abutments on said frame offset from a vertical line passing through the axis of said roller wheel and contacting said stub shafts when said roller wheel is in said second position and maintained in said second position by the weight of the roller.

2. In a roller having a cylindrical roller wheel rotatably mounted within a frame which overlies only a portion of the roller wheel ends, transporting means for the roller comprising a hollow tube running longitudinally through said roller wheel and offset from its axis of rotation, stub shafts carrying wheels removably mounted in said tube ends, said wheels having a radius of greater length than the shortest distance from said tube to the roller wheel surface so that in one position of the roller wheel the wheels will be out of contact with the ground and in a secing position of the roller wheel the wheels will support the roller wheel above the ground and means for maintaining said roller wheel in said second position, comprising abutments on said frame offset from a vertical line passing through the axis of said roller wheel and contacting said stub shafts when said roller wheel is in said second position and maintained in said second position by the weight of the roller, said stub shafts having a projection which is adapted to slip behind a shoulder on said abutments and prevent longitudinal movement of said stub shafts when said roller wheel is in said second position.

3. In a roller having a cylindrical roller wheel rotatably mounted within a frame which overlies only a portion of the roller wheel ends, transporting means for the roller comprising a hollow tube running longitudinally through said roller wheel and offset from its axis of rotation, stub shafts carrying wheels removably mounted in said tube ends, said wheels having a radius of greater length than the shortest distance from said tube to the roller wheel surface so that in one position of the roller wheel the wheels will be out of contact with the ground and in a second position of the roller wheel the wheels will support the roller wheel above the ground and means for maintaining said roller wheel in said second position, comprising abutments on said frame offset from a vertical line passing through the axis of said roller wheel and contacting said stub shafts when said roller wheel is in said second position and maintained in said second position by the weight of the roller, said stub shafts having a projecting key which is adapted to slide behind a shoulder on said abutments and prevent longitudinal movement of said stub shafts when said roller wheel is in said second position, said tube ends being notched to receive a portion of said stub shaft keys to prevent rotation of the stub shafts in the tube.

4. In a roller having a cylindrical roller wheel rotatably mounted within a frame which overlies only a portion of the roller wheel ends, transporting means for the roller comprising a hollow tube running longitudinally through said roller wheel and offset from its axis of rotation, stub shafts carrying wheels removably mounted in said tube ends, said wheels having a radius of greater length than the shortest distance from said tube to the roller wheel surface so that in one position of the roller wheel the wheels will be out of contact with the ground and in a second position of the roller wheel the wheels will support the roller wheel above the ground and means for maintaining said roller wheel in said second position, comprising abutments on said frame offset from a vertical line passing through the axis of said roller wheel and contacting said stub shafts when said roller wheel is in said second position and maintained in said second position by the weight of the roller, said abutments being spaced from a vertical plane passing through the axis of rotation of the roller wheel.

5. In a roller having a cylindrical roller wheel rotatably mounted within a frame which overlies only a portion of the roller wheel ends, transporting means for the roller comprising a hollow tube running longitudinally through said roller wheel and offset from its axis of rotation, stub shafts carrying wheels removably mounted in said tube ends, said wheels having a radius of greater length than the shortest distance from said tube to the roller wheel surface so that in one position of the roller wheel the wheels will be out of contact with the ground and in a second position of the roller wheel the wheels will support the roller wheel above the ground and means for maintaining said roller wheel in said second position, comprising abutments spaced from the roller wheel on said frame and offset from a vertical line passing through the axis of said roller wheel and contacting said stub shafts when said roller wheel is in said second position and maintained in said second position by the weight of the roller, said stub shafts having a projection thereon which is adapted to slide between the abutments and the roller wheel and prevent removal of said stub shafts from said tube when said roller wheel is in said second position.

6. In a roller having a cylindrical roller wheel rotatably mounted within a frame which overlies only a portion of the roller wheel ends, transporting means for the roller comprising a hollow tube running longitudinally through said roller wheel and offset from its axis of rotation, stub shafts carrying wheels removably mounted in said tube ends, said wheels having a radius of greater length than the shortest distance from said tube to the roller wheel surface so that in one position of the roller wheel the wheels will be out of contact with the ground and in a second position of the roller wheel the wheels will support the roller wheel above the ground and means for maintaining said roller wheel in said second position, comprising portions of the frame longitudinally offset from a vertical line passing through the axis of said roller wheel which contact said stub shafts when said roller wheel is in said second position and maintained in said second position by the weight of the roller.

7. In a roller having a cylindrical roller wheel rotatably mounted within a frame which overlies only a portion of the roller wheel ends, transporting means for the roller comprising a hollow tube running longitudinally through said roller wheel and offset from its axis of rotation, stub shafts carrying wheels removably mounted in said tube ends, said wheels having a radius of greater length than the shortest distance from said tube to the roller wheel surface so that in one position of the roller wheel the wheels will be out of contact with the ground and in a second position of the roller wheel the wheels will support the roller wheel above the ground and means for maintaining said roller wheel in said second position, comprising portions of the frame spaced from the roller wheel and offset from a vertical line passing through the axis of said roller wheel which contact said stub shafts when said roller wheel is in said second position and maintained in said second position by the weight of the roller, said stub shafts having a projection thereon which is adapted to slide between the frame and the roller wheel and prevent removal of said stub shafts from said tube when said roller wheel is in said second position.

HERBERT P. HAUPT.

REFERENCES CITED

The following references are of record in the file of this patent:

UNITED STATES PATENTS

| Number | Name | Date |
|---|---|---|
| 1,468,768 | Vogel et al. | Sept. 25, 1923 |
| 2,029,659 | Greiner | Feb. 4, 1936 |
| 2,348,445 | Bayer | May 9, 1944 |
| 2,479,421 | Sempe | Aug. 16, 1949 |